United States Patent
Glickman et al.

(10) Patent No.: US 10,981,449 B2
(45) Date of Patent: Apr. 20, 2021

(54) TIE-DOWN HANDLE WITH ELECTRIC PORT

(71) Applicant: Ford Global Technologies, LLC, Dearborn, MI (US)

(72) Inventors: David Brian Glickman, Southfield, MI (US); Stuart Salter, White Lake, MI (US); Paul Kenneth Dellock, Northville, MI (US); Kevin Berington Johnson, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/436,092

(22) Filed: Jun. 10, 2019

(65) Prior Publication Data
US 2020/0384863 A1 Dec. 10, 2020

(51) Int. Cl.
*B60L 1/00* (2006.01)
*B60R 9/06* (2006.01)
(Continued)

(52) U.S. Cl.
CPC ............. *B60L 1/006* (2013.01); *B60L 53/16* (2019.02); *B60Q 1/2661* (2013.01); *B60Q 1/34* (2013.01); *B60Q 9/00* (2013.01); *B60R 9/06* (2013.01); *B60R 16/02* (2013.01); *H01R 13/5213* (2013.01); *H01R 13/6683* (2013.01);
(Continued)

(58) Field of Classification Search
CPC ....... B60L 1/006; B60L 53/16; B60Q 1/2661; B60Q 9/00; B60Q 2400/30; B60R 9/06; B60R 16/02; H01R 13/5213; H01R 13/73; H01R 2201/26; H02J 7/0047
See application file for complete search history.

(56) References Cited

U.S. PATENT DOCUMENTS 8,853,996 B2 10/2014 Sekido et al.
9,533,599 B2 1/2017 Soden et al.
(Continued)

FOREIGN PATENT DOCUMENTS

CN 203172547 9/2013

OTHER PUBLICATIONS

"Mobile power stations on the way—with the use of electric car Nissan Leaf to stabilise the German electricity grid." Published by The Mobility House. (Oct. 22, 2018). Retrieved from https://www.mobilityhouse.com/int_en/magazine/press-releases/v2g-hagen-electric-car-stabilise-electricity-grid.html/.

*Primary Examiner* — Jared Fureman
*Assistant Examiner* — Duc M Pham
(74) *Attorney, Agent, or Firm* — David Coppiellie; Carlson, Gaskey & Olds, P.C.

(57) ABSTRACT

A disclosed tie-down handle assembly for a vehicle includes a mount portion attachable to a vehicle structure and an electric outlet for coupling to an electric system of the vehicle. A disclosed method of operating a vehicle electric interface system includes, identifying an electrical parameter from an external electrical conduit coupled to an electric outlet within a tie-down handle assembly attached to a vehicle structure, selecting an output from a vehicle electric system in response to the measured electric parameter at the electric outlet and operating the vehicle electric system to either generate a power output to the electric outlet or direct power input into the electric outlet to a vehicle electric system in response to the selected output.

16 Claims, 5 Drawing Sheets

(51) Int. Cl.
    *B60Q 1/34*        (2006.01)
    *B60L 53/16*      (2019.01)
    *B60Q 1/26*        (2006.01)
    *B60Q 9/00*        (2006.01)
    *H01R 13/73*      (2006.01)
    *H01R 13/52*      (2006.01)
    *H01R 13/66*      (2006.01)
    *H01R 13/717*     (2006.01)
    *H02J 7/00*         (2006.01)
    *B60R 16/02*      (2006.01)

(52) U.S. Cl.
    CPC ........... *H01R 13/717* (2013.01); *H01R 13/73* (2013.01); *H02J 7/0047* (2013.01); *B60Q 2400/30* (2013.01); *H01R 2201/26* (2013.01)

(56) References Cited

U.S. PATENT DOCUMENTS

| | | | |
|---|---|---|---|
| 2001/0047896 A1* | 12/2001 | Matsuura | B62D 25/12 |
| | | | 180/69.24 |
| 2013/0249252 A1 | 9/2013 | Schmid et al. | |
| 2014/0216841 A1* | 8/2014 | Winter | H02K 7/1815 |
| | | | 180/271 |

\* cited by examiner

TIE-DOWN HANDLE WITH ELECTRIC PORT

BACKGROUND

Vehicles may include structures to aid in securement of items attached to the vehicle. Vehicles may also include electric systems such as a block heater for maintaining oil temperatures in extreme cold conditions and a battery charging system. An externally accessible electric outlet may therefore maybe desirable for accessing electrical systems and powering electrical devices while outside the vehicle.

SUMMARY

A tie-down handle assembly for a vehicle according to an exemplary aspect of the present disclosure includes, among other things, a mount portion attachable to a vehicle structure and an electric outlet for coupling to an electric system of the vehicle.

Another example of the foregoing assembly, the mount portion includes a flange attachable to the vehicle structure and an electric connector assembly.

Another example of any of the foregoing assemblies, the mount portion includes in handle with a mount opening defining a space for a tie-down.

Another example of any of the foregoing assemblies, the mount portion includes a front portion extending vehicle forward of the handle, the electric outlet disposed in the front portion.

Another example of any of the foregoing assemblies, the mount portion extends vertically upright.

Another example of any of the foregoing assemblies, including a movable cover disposed in the front portion over the electric outlet.

Another example of any of the foregoing assemblies, including a sensor for communicating a position of the cover to the electric system of the vehicle.

Another example of any of the foregoing assemblies, including an indicator for indicating an electric state of a vehicle system electrically coupled to the electric outlet.

Another example of the foregoing assemblies wherein the indicator comprises a light assembly.

A vehicle electric interface system according to another exemplary aspect of the present disclosure includes, amount other possible things, a tie-down handle assembly including a mount portion attachable to a vehicle structure and an electric outlet for coupling to an electric system of the vehicle and a control module in electric communication with the electric outlet, the control module configured for selecting operation of the electric outlet in response to a sensed electrical input into the electrical outlet.

Another example of the foregoing system, wherein the control module includes at least one processor for measuring a voltage from the electrical outlet.

Another example of any of the foregoing systems, wherein the at least one processor engages one of a plurality or relays in response to a measured voltage, wherein the plurality of relays provide for selective electric communication with at least one of a power module, a vehicle battery charging system, a block heater and a power inverter.

Another example of any of the foregoing systems including an indicator light providing a visual representation of a charge condition of a vehicle battery when the vehicle battery charging system is engaged.

Another example of any of the foregoing systems including a cover disposed over the electric outlet and a sensor communicating a position of the cover to the control module.

Another example of any of the foregoing systems wherein the mount portion includes a flange attachable to the vehicle structure and a handle with a mount opening defining a space for a tie-down.

A method of operating a vehicle electric interface system according to another exemplary aspect of the present disclosure includes, among other possible things, identifying an electrical parameter from an external electrical conduit coupled to an electric outlet within a tie-down handle assembly attached to a vehicle structure, selecting an output from a vehicle electric system in response to the measured electric parameter at the electric outlet and operating the vehicle electric system to either generate a power output to the electric outlet or direct power input into the electric outlet to a vehicle electric system in response to the selected output.

Another example of the foregoing method including communicating electric power to the electric outlet in response to not identifying a voltage input into the electric outlet.

Another example of any of the foregoing methods including directing electric power to one of a battery charging system or a block heater in response to identifying a voltage input into the electric outlet.

Another example of any of the foregoing methods including actuating an indicator mounted within the tie-down handle assembly for visually indicating a charge state of a battery during recharging.

Another example of any of the foregoing methods including sensing a position of a cover disposed over the electric outlet and the presence of a plug engaged to the electric outlet and prompting the identification of the electrical parameter at the electric outlet in response the sensor indicating that the cover is open and that a plug is engaged to the electric outlet.

The various features and advantages of this disclosure will become apparent to those skilled in the art from the following detailed description. The drawings that accompany the detailed description can be briefly described as follows.

DETAILED DESCRIPTION

Figure 1:
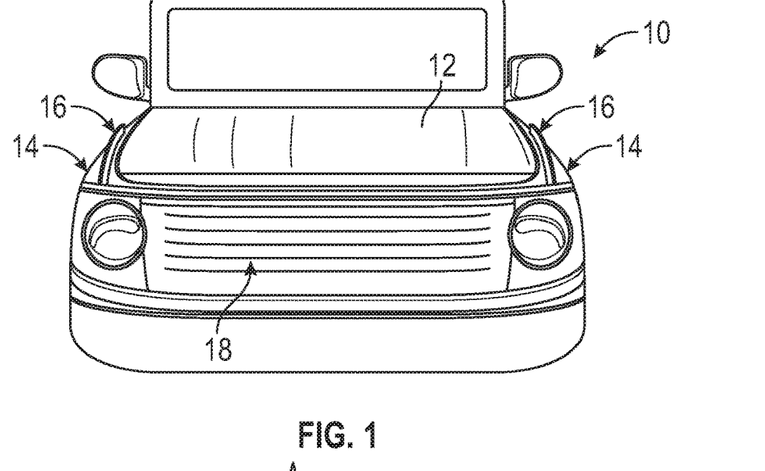
FIG. 1 is a schematic view of a vehicle including an example tie-down handle assembly embodiment.
Figure 2:
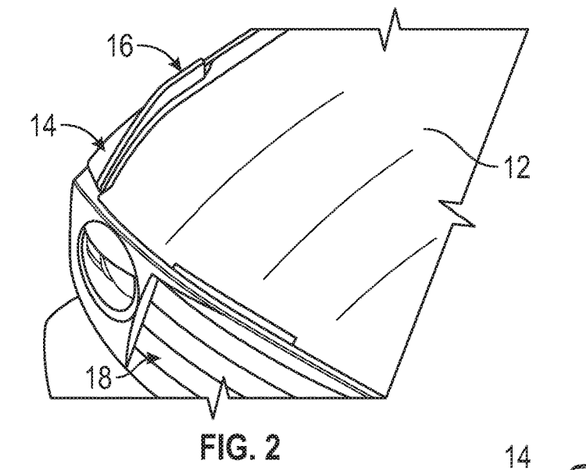
FIG. 2 is a side view of the vehicle and an example tie-down handle assembly embodiment.
Figure 3:
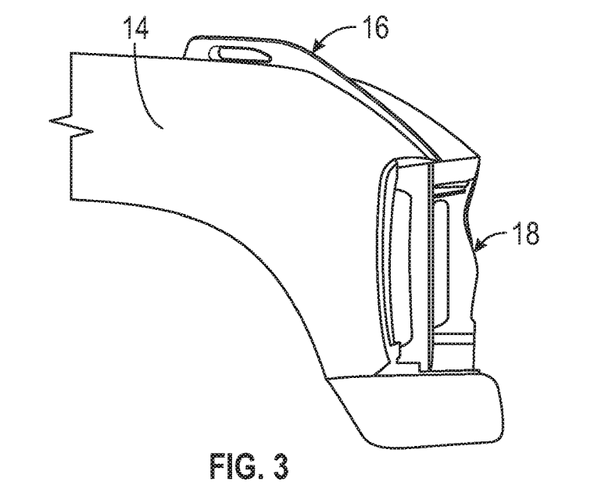
FIG. 3 is a front perspective view of the vehicle and an example tie-down handle assembly embodiment.

Referring to FIGS. 1, 2 and 3, a front portion of a vehicle 10 includes fenders 14 and front hood 12. The hood 12 is openable to provide access to an inner compartment. Tie-down handle assemblies 16 are provided at each front corner of the vehicle 10 to a securement point for securing cargo to the vehicle 10.

Figure 4:
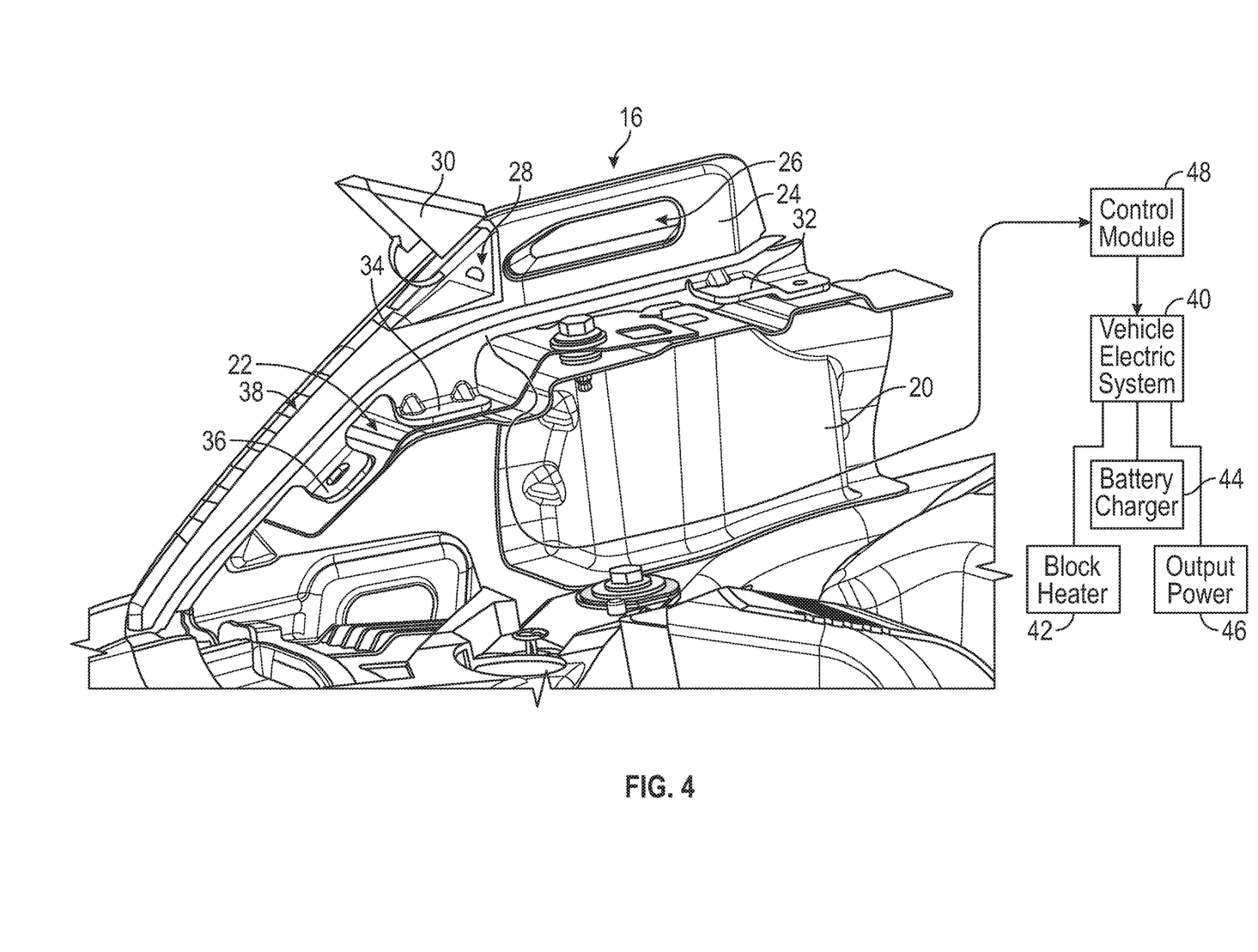
FIG. 4 is a perspective view of an inner structure of the vehicle and an example tie-down assembly embodiment.

Referring to FIG. 4 with continued reference to FIGS. 1, 2 and 3, the example tie-down assembly 16 is secured to an inner shelf 22 on an inner fender portion 20. The shelf 22 is a fixed part of the vehicle and is accessible upon opening of the hood 12. The tie-down handle assembly 16 is secured to the vehicle structure such that the hood 12 may close without obstruction.

The tie-down handle assembly 16 includes a mount portion 24 with an opening 26. The example opening 26 is elongated to enable securement of lines, hooks and other tie-down structures. The opening 26 is a closed interior space defined within the mount portion 24. The tie-down handle assembly 16 has flanges 32, 34 and 36 that include openings for fasteners for securement to the inner structure of the vehicle. The flanges 32, 34 and 36 are arranged and configured to not obstruct opening and closing of the hood 12.

The tie-down handle assembly 16 has an integrated electric outlet 28 disposed on a forward facing surface of the mount portion 24. The electric outlet 28 is electrically coupled to the vehicle electric system 40 and controlled by a control module 48. A cover 30 covers the outlet 28 when not in use. The cover 30 conforms to the surface of the tie-down handle assembly 16 when in the closed condition. The outlet 28 provides for the electrical communication of power input into the vehicle electrical system 40. Power input into the vehicle electrical system 40 can be utilized by a battery charging system 44 or by an engine block heater 42.

It should be understood, that although two tie-down mounting handle assemblies 16 are shown at the front of the vehicle 10, both or only one of the tie-down mounting handle assemblies 16 may include an electric outlet 28. Moreover, although the example tie-down mounting handle assemblies are disclosed by way of example at a forward corners of the vehicle 10, the example tie-down handle assembly 16 may be located at other locations on the vehicle 10.

Power may also be output through the outlet 28 at a desired voltage and current to power appliances. Appliances powered by the outlet can include battery chargers for phones, computers, power tools, radios, lights or any other electrical device. The output power is provided by an output power system 46 within the vehicle 46 that provides, in one disclosed example, 115 VAC power. Other power output modes could also be utilized and are within the contemplation of this disclosure. Moreover, the outlet 28 may be configured to correspond with different regional outlet configurations.

An indicator light 38 is provided on a forward portion of the tie-down handle assembly 16. The indicator light 38 may be operated as a running light, turn signal or in any manner that corresponds with operation of the vehicle 10. The indicator light 38 may also be operated to provide a visual indication of an electric state of the vehicle electric system 40. In one disclosed embodiment, the light indicator 38 may include a plurality of individually actuatable light elements that can be lighted in a manner that visually indicates a charge state of a vehicle battery. In concert with the battery charger 44, the indicator light 38 would be proportionally illuminated to provide a visual cue of the charge state of the vehicle battery during charging.

Alternatively, the indicator light 38 may include lighting elements that are capable of changing color. The indicator light 38 may then be operated to emit a red light to indicate a low battery charge and green once the battery is fully charged. Other colors such as yellow could be utilized to indicate partial charge states. It should be appreciated that other lighting configurations for indicating a states of the vehicle electric system 40 are within the contemplation and scope of this disclosure.

Figure 5:
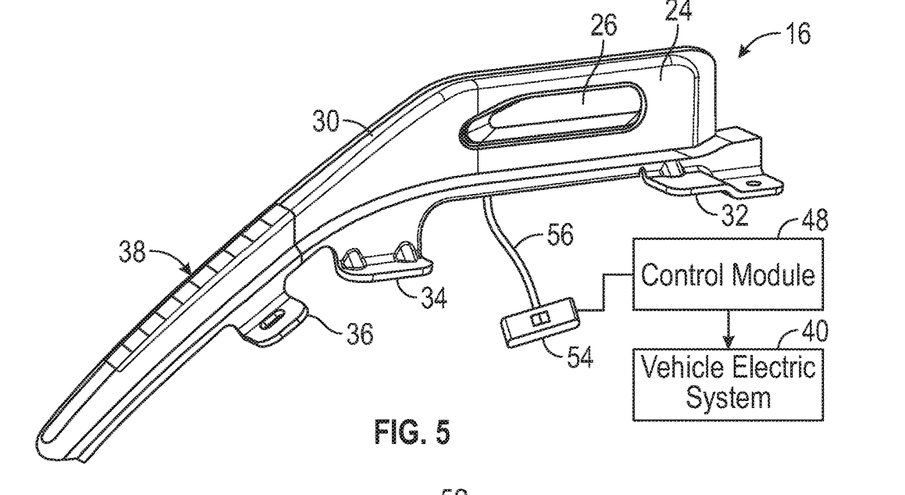
FIG. 5 is a side view of the example tie-down handle assembly.
Figure 6:
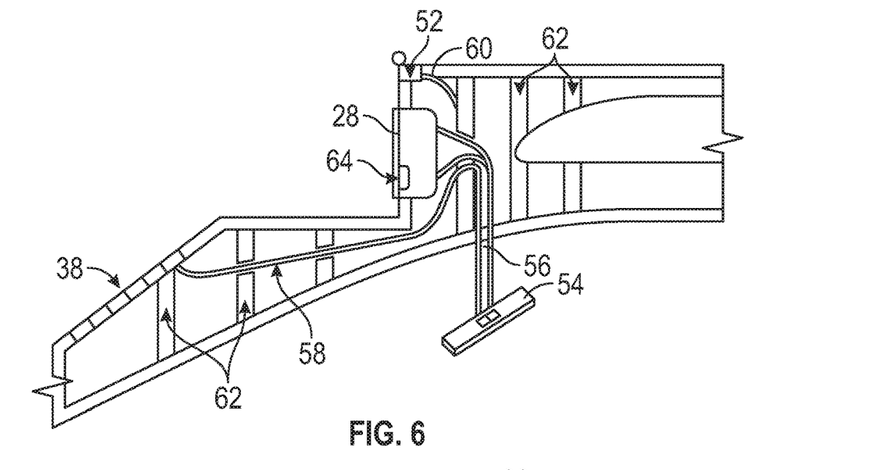
FIG. 6 is a partial cut-away view of the example tie-down handle assembly

Referring to FIGS. 5 and 6 with continued reference to FIG. 4, the example tie-down handle assembly 16 is shown with the cover 30 in a closed position. The tie-down handle assembly 16 is separable from the vehicle 10 and may be switched with handles with the same mounting flanges 32, 34 and 36.

The example tie-down handle assembly 16 may be an over-molded plastic part with wiring over-molded within the plastic structure as shown in FIG. 6. The outlet 28 and indicator light 38 are wired to a common external lead 56 with an electrical connector 54. The connector 54 couples the electric components of the handle assembly 16 to the vehicle electric system 40. In this disclosed example, a sensor 52 is included to provide information on a position of the cover 30. When the cover 30 is moved to an open position, the sensor 52 communicates the open condition of the cover 30 to the control module 48. The outlet 28 may also include a sensor 64 that indicates if a plug is engaged. The control module 48 may use information relating to the position of the cover 30 and the presence of a plug engaged to the outlet for operating the outlet 28. A lead 60 from the sensor 52 along with a lead 58 and wires from the outlet 28 are combined into a single pigtail lead 56 coupled to the connector 54.

The tie-down handle assembly 16 may be formed from a plastic material, carbon fiber material or any other alternate material that enables integration of the electrical features. In the example shown in FIG. 6, internal structural members 62 are provided to increase rigidity while reducing material content and thereby weight. Although and example embodiment of material and internal structure is shown by way of example, other material, structures and shapes are within the contemplation of this disclosure.

Figure 7:
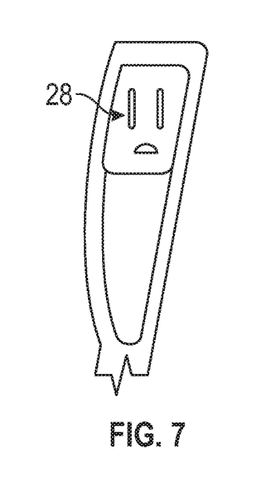
FIG. 7 is a front view of an electric outlet of the example tie-down handle assembly.
Figure 8:
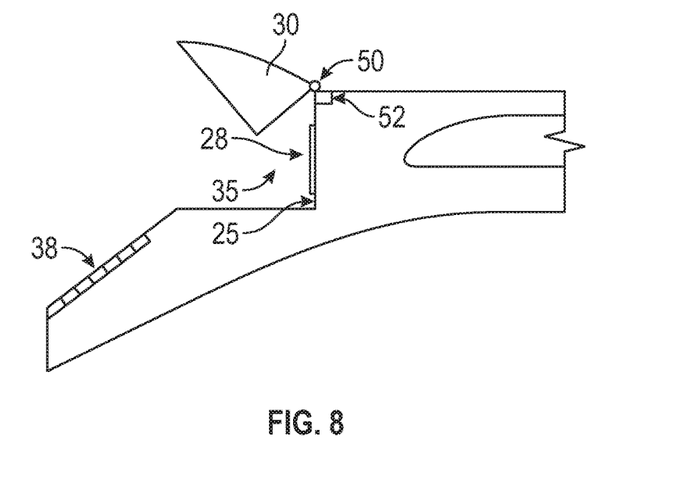
FIG. 8 is another side view of the example tie-down handle assembly.

Referring to FIGS. 7 and 8, with continued reference to FIGS. 5 and 6, the outlet 28 is disposed on a forward facing vertical surface 25 in a cutout 35 of the handle assembly 16. The cover 30 is movable between a closed position shown in FIG. 5 and an open position shown in FIG. 8. The cover 30 may include a spring loaded pivot 50 that biases the cover 30 toward a closed position. The cutout 35 provides room for a common plug to engage the outlet 28. The cutout 35 and cover 30 may be configured to cover a plug engaged to the outlet 28. Although the example outlet 28 is disclosed as facing vehicle forward, the outlet 28 may also face vehicle rearward, to one side or angled as desired to both provide access to the outlet 28 while protecting the outlet 28 from the elements.

Figure 9:
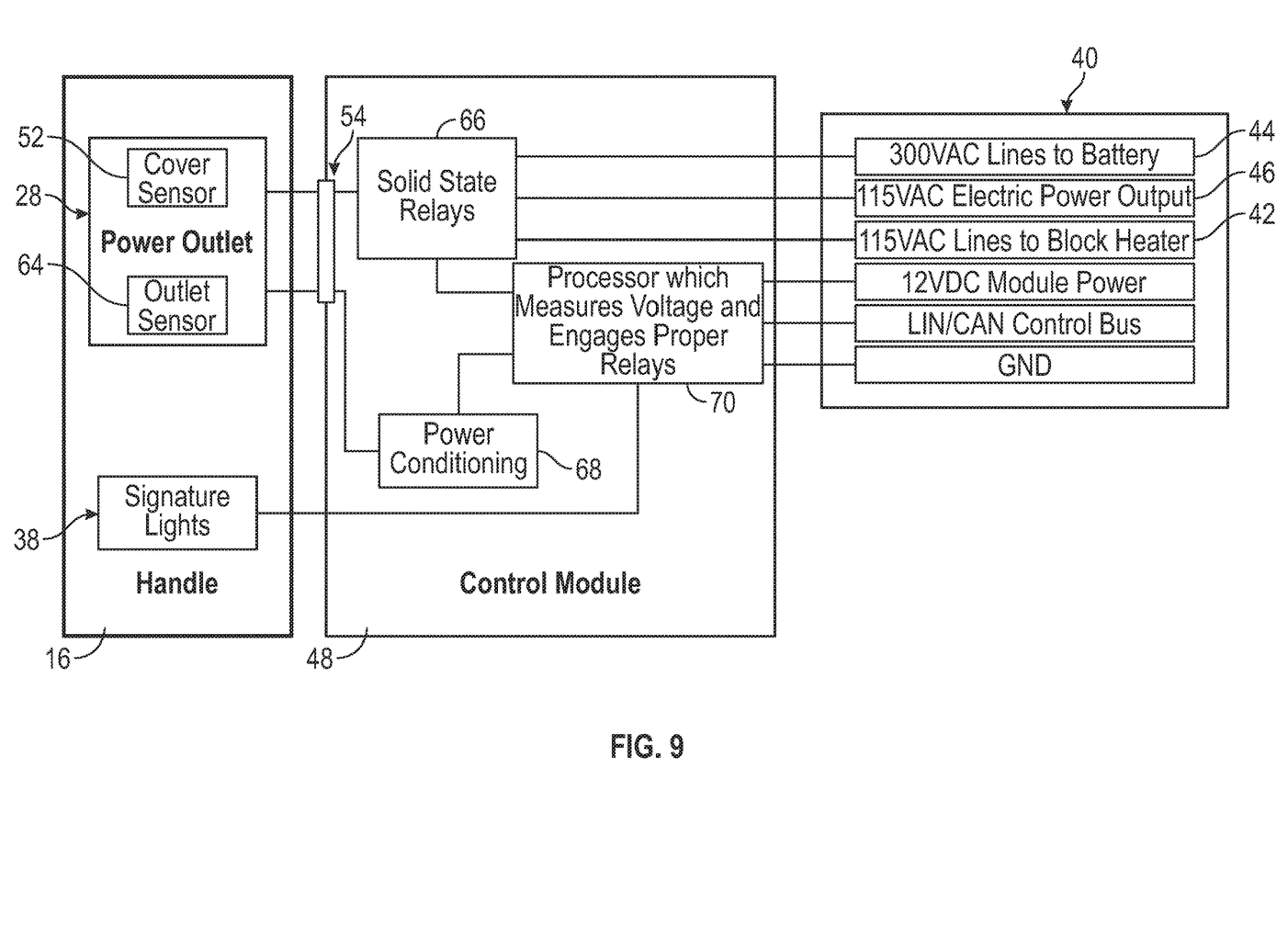
FIG. 9 is a schematic diagram of an example electrical system of a tie-down handle assembly embodiment.

Referring to FIG. 9, a diagram of the electrical interface between the electric features of the tie-down handle assembly 16 and the vehicle electric system 40 is shown. The control module 48 is coupled to the electrical features of the tie-down handle assembly 16 through the connector 54. The control module 48 can be dedicated control module for the tie-down handle assembly 16 or part of a vehicle or system controller. The example control module 48 includes a set of relays 66 that are controlled by at least one processor 70. A power conditioner 68 controls and measures power input into the outlet 28 and power output from the vehicle electric system 40 to the outlet 28. The processors 70 uses information obtained from the outlet 28 and sensor 52, 64 to determine which of the relays 66 should be activated.

The relays 66 route power to the vehicle electrical system 40 according to measured electrical characteristics. The measured electrical characteristics can include voltage, current or any other characteristic that provides an indication of how the outlet 28 is being utilized. The outlet 28 in one example is used as an inlet port for charging a vehicle battery. The charging system 44 may be for a battery utilized to start an internal combustion engine or batteries for an electric vehicle.

The outlet 28 may also be in the electrical input port for the block heater system 46. Block heater systems 46 are utilized in cold environments to maintain engine fluids within desired operating temperatures. The example tie-down handle assembly 16 provides an external accessible electric connection point that does not required opening of the hood 12. Moreover, the tie-down handle assembly 16 is located in an easily accessible location that is convenient for an operator plugging in a vehicle to an external power source while a challenging environment.

The outlet 28 may also provide an output alternating voltage for use when the vehicle is in a remote location. The control module 48 would engage an inverter to convert direct current power from the vehicle battery to alternating current power for operating external devices. The external devices can include chargers, tools, lights or any other electrical appliance. The control module 48 controls the power conditioner 68 to provide the required output or direct power according to the measured operation.

Figure 10:
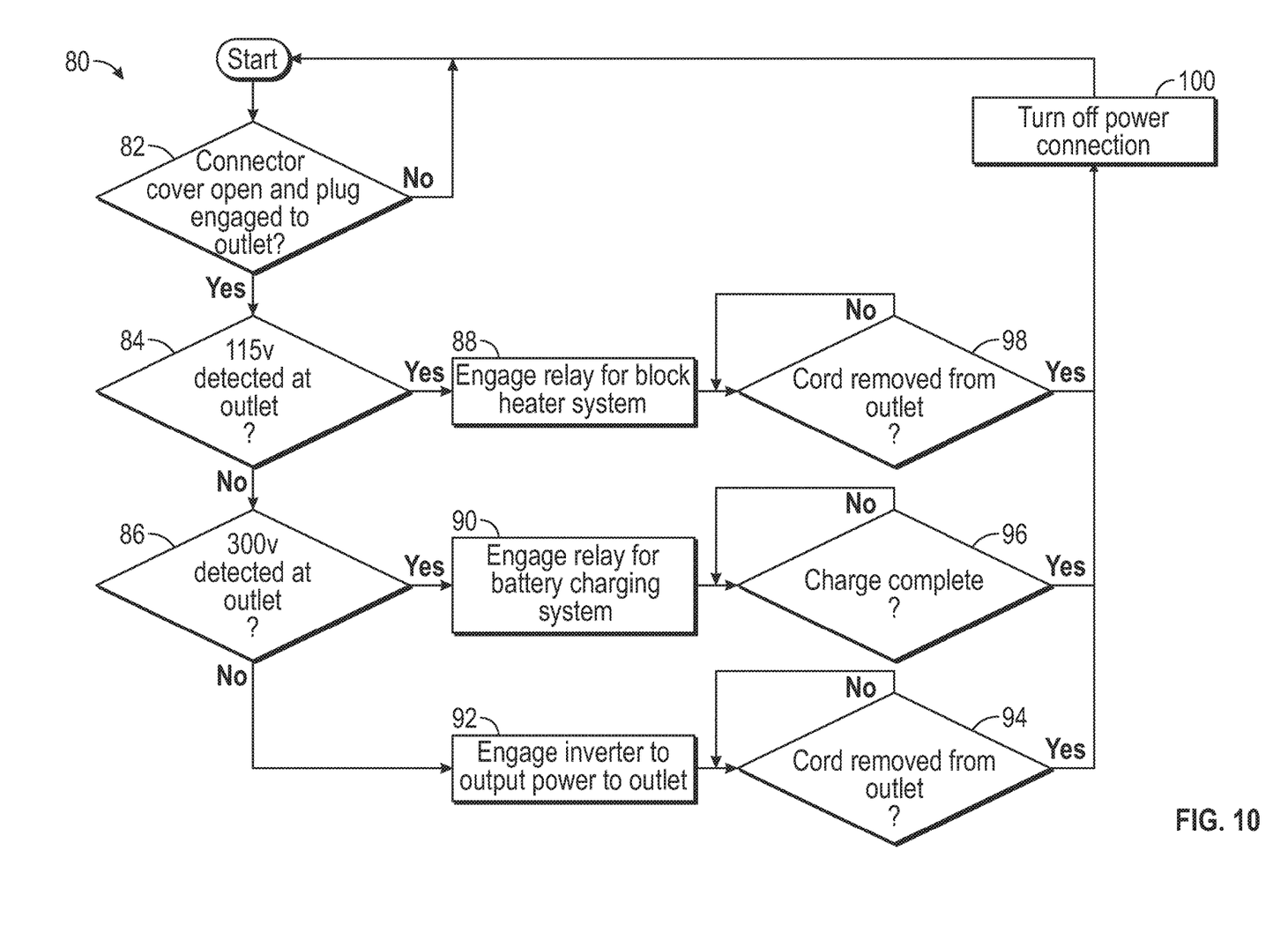
FIG. 10 is a schematic diagram of a method of operating an example vehicle electric interface.

Referring to FIG. 10 with continued reference to FIG. 9, the outlet 28 of the example tie-down handle assembly 16 is operated in one disclosed embodiment according to the diagram indicated at 80. The control module 48 receives information indicative of a plug being engaged to eh outlet 28 as shown at 82. The presence of a plug engaged to the outlet 28 can be initially discerned by information from the sensor 52 pertaining to the position of the cover 30 and the sensor 64 that detects the presence of a plug. If not plug is present, the system reverts to the beginning. If a plug is detected, a further inquiry is made regarding power input into the outlet 28. If the inlet power is 115 VAC as indicated at 84, than it is determined that an input to the block heater system 42 is desired and a relay for the block heater system is engaged as shown at 88.

If the voltage input does not correspond to what is expected for the block heater system 42 but corresponds with the voltage expected for the battery charging system 44 as indicated at 86 than the relay corresponding with the battery charging system is engaged as indicated at 90.

If no voltage, input is detected, than a determination is made that a power output is desired and an inverter is engaged as indicated at 92 to provide an AC power output. The inverter is provided within the vehicle to convert DC power from the batteries to the outlet to power a tool or appliance with power from the vehicle.

Each of the vehicle systems 40 operate differently and therefore the control module 48 tailors operation to each system 40. When the block heater 42 is engaged, power is continually provided until the external plug is removed as indicated at 98. The block heater 42 continually draws power until disconnected. The battery charging system 44 will continued operation until the battery is fully charged as is indicated at 96. The output power system will operate until the cord is removes as is indicated at 94. For each of the vehicle systems 40, once the end condition indicated at 94, 96 and 98 respectively, is attained, power to or through the outlet 28 will be turned off as indicated at 100.

The example tie-down handle assembly 16 includes the electric outlet 28 that provides an accessible external electrical connection point for different vehicle electrical systems while also providing a physical mounting and tie-down location.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A tie-down handle assembly for a vehicle comprising:
   a mount portion attachable to a vehicle structure, wherein the mount portion includes a flange attachable to the vehicle structure and an electrical connector assembly; and
   an electric outlet for coupling to an electric system of the vehicle.

2. The tie-down handle assembly as recited in claim 1, wherein the mount portion includes in handle with a mount opening defining a space for a tie-down.

3. The tie-down handle assembly as recited in claim 2, wherein the mount portion includes a front portion extending vehicle forward of the handle, the electric outlet disposed in the front portion.

4. The tie-down handle assembly as recited in claim 3, wherein the mount portion extends vertically upright.

5. The tie-down handle assembly as recited in claim 3, including a movable cover disposed in the front portion over the electric outlet.

6. The tie-down handle assembly as recited in claim 5, including a sensor for communicating a position of the cover to the electric system of the vehicle.

7. The tie-down handle assembly as recited in claim 1, including an indicator for indicating an electric state of a vehicle system electrically coupled to the electric outlet.

8. The tie-down handle assembly as recited in claim 7, wherein the indicator comprises a light assembly.

9. A vehicle electric interface system comprising:
   a tie-down handle assembly including a mount portion attachable to a vehicle structure and an electric outlet for coupling to an electric system of the vehicle; and
   a control module in electric communication with the electric outlet, the control module configured for selecting operation of the electric outlet in response to a sensed electrical input into the electrical outlet, the control module including at least one processor for measuring a measured voltage from the electric outlet and the at least one processor engages one of a plurality or relays in response to a measured voltage, wherein the plurality of relays provide for selective electric communication with at least one of a power module, a vehicle battery charging system, a block heater or a power inverter.

10. The vehicle electric interface system as recited in claim 9, including an indicator light providing a visual representation of a charge condition of a vehicle battery when the vehicle battery charging system is engaged.

11. The vehicle electric interface system as recited in claim 9, including a cover disposed over the electric outlet and a sensor communicating a position of the cover to the control module.

12. The vehicle electric interface system as recited in claim 9, wherein the mount portion includes a flange attachable to the vehicle structure and a handle with a mount opening defining a space for a tie-down.

13. A method of operating a vehicle electric interface system comprising:

sensing a position of a cover disposed over an electric outlet and the presence of a plug engaged to the electric outlet;

prompting the identification of an electrical parameter at the electric outlet in response to sensing that the cover is open and that a plug is engaged to the electric outlet;

identifying the electrical parameter from an external electrical conduit coupled to the electric outlet within a tie-down handle assembly attached to a vehicle structure;

selecting an output from a vehicle electric system in response to the measured electric parameter at the electric outlet; and operating the vehicle electric system to either generate a power output to the electric outlet or direct power input into the electric outlet to a vehicle electric system in response to the selected output.

14. The method as recited in claim 13, including communicating electric power to the electric outlet in response to not identifying a voltage input into the electric outlet.

15. The method as recited in claim 13, including directing electric power to one of a battery charging system or a block heater in response to identifying a voltage input into the electric outlet.

16. The method as recited in claim 15, including actuating an indicator mounted within the tie-down handle assembly for visually indicating a charge state of a battery during recharging.

* * * * *

UNITED STATES PATENT AND TRADEMARK OFFICE
CERTIFICATE OF CORRECTION

| | | |
|---|---|---|
| PATENT NO. | : 10,981,449 B2 | Page 1 of 1 |
| APPLICATION NO. | : 16/436092 | |
| DATED | : April 20, 2021 | |
| INVENTOR(S) | : David Brian Glickman et al. | |

It is certified that error appears in the above-identified patent and that said Letters Patent is hereby corrected as shown below:

In the Claims

In Claim 13, Column 8, Line 13; replace "the measured electric parameter" with --the identified electrical parameter--

Signed and Sealed this
First Day of March, 2022

Drew Hirshfeld
*Performing the Functions and Duties of the
Under Secretary of Commerce for Intellectual Property and
Director of the United States Patent and Trademark Office*